Aug. 8, 1950  C. E. TOTMAN  2,518,402
COMPRESSION CONTROL FOR BALING PRESSES
Filed Aug. 17, 1946
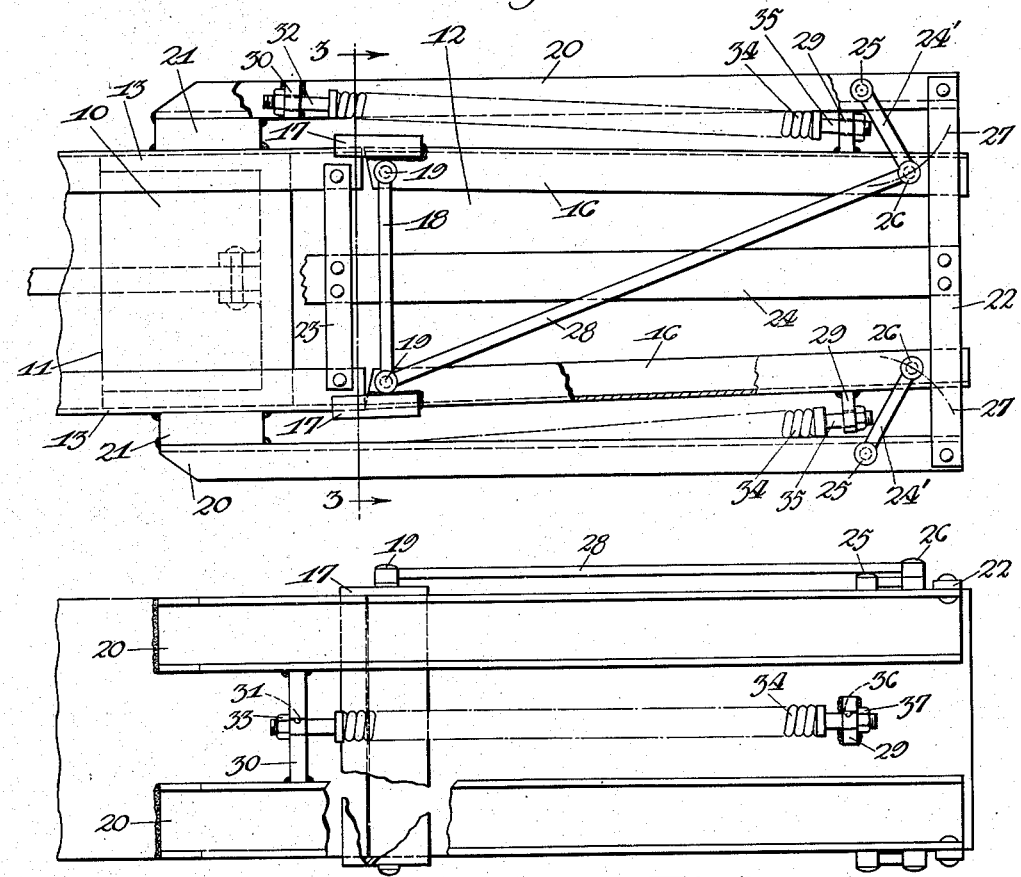
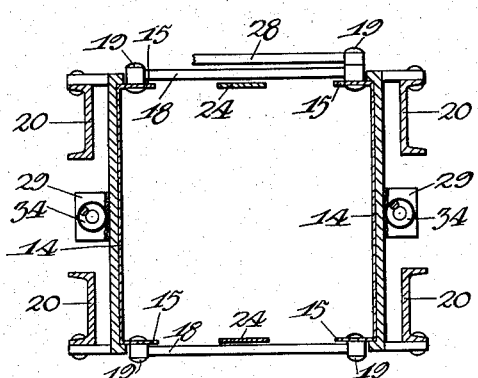
Inventor
Clifford E. Totman
By Paul O. Pippel
Atty.

Patented Aug. 8, 1950

2,518,402

UNITED STATES PATENT OFFICE 2,518,402

COMPRESSION CONTROL FOR BALING PRESSES

Clifford E. Totman, Rio Vista, Calif., assignor to International Harvester Company, a corporation of New Jersey Application August 17, 1946, Serial No. 691,311

13 Claims. (Cl. 100—23)

This invention relates to baling presses. More specifically, it relates to compression control means for use in the baling chamber of a baling press.

In the conventional hay press, means are usually provided for manually adjusting the restriction at the outlet end of the bale chamber in order to control the pressure in the bale chamber and the density or weight of the bales being made. The Hitchcock Patent 2,389,510 discloses an automatic means whereby the friction of the moving bale on the sides of the bale chamber automatically regulates the compression in the bale chamber.

The principal object of the present invention is to provide improved automatic pressure regulating means actuated by friction between the bale in a bale chamber and the walls thereof.

Another important object is to provide improved bale compression adjusting means in which positive linkage is provided for supporting the movable walls of the bale chamber and in which the resilient means for regulating the compression in the bale chamber may be adjusted to compensate for different conditions of operation.

Another important object is to interconnect by positive linkage two movable walls of a baling chamber, whereby said walls move in the same direction simultaneously and with substantially the same movement, both in a longitudinal direction and in an angular direction for diverging and converging.

The above objects and others, which will be apparent from the detailed description to follow, are accomplished by a construction as illustrated in the drawings, in which:

Figure 1 is a diagrammatic plan view of a baling chamber with certain portions broken away to better show the compression control structure;

Figure 2 is a side elevation of a structure shown in Figure 1 with certain portions broken away to better show the compression control structure; and Figure 3 is a section taken on the line 3—3 of Figure 1.

The drawing diagrammatically illustrates a portion of a baling press which may be of any conventional type. Any conventional means may be utilized for feeding the material to be baled to the plunger chamber and for operating the baling plunger. Also, any type of frame work may be used for supporting the baling chamber in any desired position for operating.

The drawing illustrates a plunger chamber 10, one side wall of which may be bent for feeding material thereto. A baling plunger 11 is illustrated in a position at the end of its compression stroke in the plunger chamber. A baling chamber 12 is formed as a continuation of the plunger chamber by a plurality of parts which will be described in detail.

The plunger chamber 10 is formed principally by two opposite walls 13, each being in the shape of a channel having a wide bottom portion 14 and narrow inturned flanges 15. The baling chamber 12 is formed essentially of two walls 16 having exactly the same channel section as the walls 13. The walls 16 are positioned in longitudinal alignment with the walls and may be considered as movable extensions of said walls. Retaining members 17 are wrapped around the ends of the walls 16 adjacent the ends of the walls 13 and are rigidly secured as by welding to the walls 16. The retaining members 17 loosely overlap the ends of the walls 13 and hold the walls 16 against inward movement toward each other with respect to the walls 13 and against edgewise movement with respect to the walls 13.

Links 18 are pivotally connected by pins 19 to the flanges of the walls 16 adjacent the ends of the walls 13. Said flanges are angled at their end portions so that they do not engage the flanges of the walls 13 during converging movement of the walls 16. The purpose of the links 18 is to hold the rear ends of the walls 16 against outward movement to thereby confine the bale being formed while at the same time permitting sliding angular movement of the walls 16 about the pins 19 as pivot points. The links 18 also permit fore and aft movement of the walls 16 in the direction of their length which may also be considered as to direction of the bale movement during formation. In describing the structure of the invention, as well as its operation, the discharge end of the bale chamber will be considered the rear end and the plunger end of the bale chamber will be termed as the forward end.

A supporting structure for the movable mounted bale chamber walls 16 is provided by a pair of spaced channel members 20 secured at each side of the plunger chamber to the walls 13 by means of spacing blocks 21 interposed between the channel members 20 and the walls 13. The members and the blocks 21 may be secured by any suitable means, such as by welding, to each other and to the walls 13 of the plunger chamber. At their rear ends the channel members 20 are connected by transverse members 22. The rear ends of the flanges 15 on the walls 13 are connected by transverse members 23 and a longitudinal bale guide and retaining member 24 joins the transverse members 22 and 23.

Short links 24' are pivotally connected by pins 25 to the channel members 20 and are connected by pins 26 to the flanges of the bale chamber forming walls 16 adjacent their rear ends. The pivot pins 25 are spaced from the rear ends of the channel members 20 a greater distance than are the pivot pins 26, whereby the links 24' are positioned at an angle extending forwardly from the pins 26 to the pins 25. As indicated by the dot-dash arcuate lines 27, which indicate the path of travel of the pins 26, the rear ends of the walls 16 are diverged or moved outwardly as the walls 16 are moved rearwardly. This is a particular significant action in the functioning of the compression control as will be hereinafter pointed out.

A diagonally extending link 28 is connected to one of the pivot pins 19 at the rear end of one of the walls 16 and to the pivot pin 26 at the forward end of the other wall 16. The purpose of this link is to stabilize the movable wall structures, so that when one wall 16 moves forwardly, the other wall 16 is moved forwardly substantially the same distance with the result that the forward ends of the walls 16 are diverged substantially the same angular distance, a reverse action resulting when one wall moves forwardly upon the reduction of compression or frictional resistance with a bale being formed.

Each of the walls 16 is provided adjacent its rearward end with an attaching bracket 29 extending outwardly substantially at right angles to the wall and midway between the channel members 20. A bracket member 30 is provided adjacent the rear end of each set of channel members 20, being secured to the flanges of said channel members. Said members extend between the flanges of the channel members and are each provided at their central portions with an opening 31. A threaded spring securing member 32 extends through each opening 31, nuts 33 being threaded on the forward ends of said members. At their rear ends said members are secured to tension springs 34, said tension springs extending rearwardly being fastened to spring securing members 35. Said members extend through openings 36 formed in the brackets 29, nuts 37 being threaded on said members to adjustably regulate the tension of the springs 34.

The operation of applicant's improved bale compression control has been explained to some extent along with the description of the component parts. During operation of the baler embodying the compression control device, material is fed to the plunger chamber and compressed at intervals into the bale chamber. The compression exerted on the bale being formed is determined by the restriction of the discharge end of the bale chamber as compared to its inlet end. This is illustrated by the converging angle of the walls 16. It has been found in practice that the friction of the material being compressed in contact with the converging walls of the bale chamber is indicative of the weight of the material being compressed, particularly under different moisture conditions, and that this friction is a function of the compression obtained in the bale and the weight of the finished bale. As disclosed in the previously mentioned Hitchcock patent, this frictional force may be utilized to regulate the compression exerted by the plunger and the resulting weight of the bale.

In the structure above described, a positive linkage is provided for supporting both ends of the bale chamber forming walls 16 with provision of fore and aft movement of the bale chamber walls with concurrent diverging and converging of the forward ends thereof. The tension springs 34 are applied to the walls in a direct line to oppose movement thereof during the exertion of frictional and compressive force on the walls. This location of the springs results in the minimum amount of spring material as the springs are located to act in a direct line at the most favorable point of application of force. Another significant feature of the invention is the means for tying the forward end of the walls 16 together to permit said walls to move in a fore and aft direction and to move angularly while at the same time confining the forward ends of the walls against any outward movement. The stabilizing member 28 provides an important function of positively connecting the two walls together along with the links 18, so that each wall moves fore and aft the same amount and angle at the discharge ends the same angular distance in the same direction simultaneously.

Applicant has disclosed and described only one preferred embodiment of his improved compression control means for baling presses, but it is understood that all modifications falling within the appended claims are contemplated as applicant's invention.

What is claimed is:

1. In a baler of the type having a plunger chamber and a bale chamber having at least two rearwardly movable walls extending in the direction of bale movement, a frame structure extending alongside said walls and spaced outwardly therefrom, adjoining link means pivotally attached to and connecting said walls at their forward ends to hold said walls against spreading at that point, links connecting the rear and discharge ends of the bale chamber walls to the frame structure, said links extending at an angle with respect to the transverse axis of the baler, whereby movement of the walls rearwardly in the direction of the bale movement causes the discharge ends of said walls to diverge and to increase the transverse dimension of the bale chamber, and resilient means connecting the walls and the frame structure for urging the walls forwardly thereby tending to converge the discharge ends of said walls.

2. In a baler of the type having a plunger chamber and a bale chamber having at least two rearwardly movable walls extending in the direction of bale movement, a frame structure extending alongside said walls and spaced outwardly therefrom, links connecting the rear and discharge ends of the bale chamber walls to the frame structure, said links extending at an angle with respect to the transverse axis of the baler, whereby movement of the walls rearwardly in the direction of the bale movement causes the discharge ends of said walls to diverge and to increase the transverse dimension of the bale chamber, a stabilizing link connected to one of said walls near its rear end and to the other wall near its forward end, whereby movement of one wall in a longitudinal direction carries the other member in the same direction for substantially the same distance, and resilient means connecting the walls and the frame structure for urging the walls forwardly thereby tending to converge the discharge ends of said walls.

3. In a baler of the type having a plunger chamber and a bale chamber having at least two rearwardly movable walls extending in the direction of bale movement, a frame structure extending alongside said walls and spaced outwardly therefrom, means connecting said walls at their forward ends to hold said walls against spreading at that point, links connecting the rear and discharge ends of the bale chamber walls to the frame structure, said links extending at an angle with respect to the transverse axis of the baler, whereby movement of the walls rearwardly in the direction of the bale movement causes the discharge ends of said walls to diverge and to increase the transverse dimension of the bale chamber, a stabilizing link connected to one of said walls near its rear end and to the other wall near its forward end, whereby movement of one wall in a longitudinal direction carries the other member in the same direction for substantially the same distance, and resilient means connecting the walls and the frame structure for urging the walls forwardly thereby tending to converge the discharge ends of said walls.

4. In a baler of the type having a plunger chamber with at least two oppositely arranged walls and a bale chamber with at least two movable walls arranged substantially in alignment with the two oppositely arranged walls of the plunger chamber, a frame structure secured to the two oppositely arranged walls of the plunger chamber and extending alongside said walls and spaced outwardly therefrom, means for holding the bale chamber walls at their plunger chamber end against spreading movement while permitting fore and aft movement, links pivotally connecting the other ends of the bale chamber walls to the frame structure, said links extending at an angle with respect to the transverse axis of the baler, whereby movement of the walls in the direction of the bale movement causes said ends of said walls to diverge and to increase the transverse dimension of the bale chamber, and resilient means connecting the walls and the frame structure for urging the walls towards the plunger chamber thereby tending to converge the other ends of said chambers.

5. A device as set forth in claim 4 in which the resilient means includes brackets on the forward ends of the bale chamber walls, brackets on the rear portions of the frame structure, and tension springs connecting said brackets.

6. In a baler of the type having a plunger chamber having at least two oppositely arranged walls and a bale chamber having at least two movable walls arranged substantially in alignment with said two oppositely arranged walls of the plunger chamber, a frame structure secured to the two oppositely arranged walls of the plunger chamber and extending alongside said two movable walls and spaced outwardly therefrom, means for holding the bale chamber walls at their plunger chamber end against spreading movement while permitting fore and aft movement, links connecting the other ends of the bale chamber walls to the frame structure, said links extending at an angle with respect to the transverse axis of the baler, whereby movement of the walls in the direction of the bale movement causes said ends of said walls to diverge and to increase the transverse dimension of the bale chamber, means connecting the two walls for transmitting fore and aft movement of one wall to the other, and resilient means connecting the walls and the frame structure for urging the walls towards the plunger chamber thereby tending to converge the other ends of said members.

7. In a baler of the type having a plunger chamber at least having two oppositely arranged walls and a bale chamber having at least two movable walls arranged substantially in alignment with said two oppositely arranged walls of the plunger chamber, a frame structure secured to the two oppositely arranged walls of the plunger chamber and extending alongside said two movable walls and spaced outwardly therefrom, means for holding the bale chamber walls at their plunger chamber end against spreading movement while permitting fore and aft movement, links connecting the other ends of the bale chamber walls to the frame structure, said links extending at an angle with respect to the transverse axis of the baler, whereby movement of the walls in the direction of the bale movement causes said ends of said walls to diverge and to increase the transverse dimension of the bale chamber, a stabilizing link connected to one of said walls near its rear end and to the other wall near its forward end, whereby movement of one wall in a longitudinal direction carries the other member in the same direction for substantially the same distance, and resilient means connecting the walls and the frame structure for urging the walls towards the plunger chamber thereby tending to converge the other ends of said members.

8. In a baler of the type having a plunger chamber having at least two spaced walls and a bale chamber formed by at least two members arranged substantially in alignment with the two spaced walls of the plunger chamber, retaining members secured to said bale chamber forming members and overlapping the ends of the two spaced walls of the plunger chamber, a frame structure secured to the two spaced walls of the plunger chamber and extending alongside the bale chamber forming members and spaced outwardly therefrom, transverse means pivotally connecting the bale chamber forming members together at their ends adjacent the plunger chamber, links connecting the other ends of the bale chamber forming members to the frame structure, said links extending at an angle with respect to the transverse axis of the baler, whereby movement of the bale chamber forming members in the direction of the bale movement causes the forward ends of said members to diverge and to increase the transverse dimension of the bale chamber at the discharge end, and resilient means connecting the bale chamber forming members and the frame structure for urging said members towards the plunger chamber thereby tending to converge the discharge ends of said members.

9. In a baler of the type having a plunger chamber having at least two spaced walls and a bale chamber formed by at least two members arranged substantially in alignment with the two spaced walls of the plunger chamber, retaining members secured to said bale chamber forming members and overlapping the ends of the two spaced walls of the plunger chamber, a frame structure secured to the two spaced walls of the plunger chamber and extending alongside the bale chamber forming members and spaced outwardly therefrom, transverse means connecting the bale chamber forming members together at their ends adjacent the plunger chamber, links connecting the other ends of the bale chamber forming members to the frame structure, whereby movement of the bale chamber forming members in the direction of the bale movement causes the forward ends of said members to diverge and to increase the transverse dimension of the bale chamber at the discharge end, a stabilizing link connected to one bale chamber forming member near its rear end and to the other bale chamber forming member near its forward end, whereby movement of one member carries the other member in the same direction for substantially the same distance, and resilient means connecting the bale chamber forming members and the frame structure for urging said members towards the plunger chamber thereby tending to converge the discharge ends of said members.

10. A baler of the type having a plunger chamber having at least two opposite walls formed of a pair of channel members having relatively wide bases and relatively narrow flanges thereon, said members being spaced apart to form a rectangular chamber, at least a pair of spaced apart bale chamber forming members having the same cross-section as said channel members and being substantially in alignment therewith, retaining members secured to said bale chamber forming members and overlapping the ends of the plunger forming chamber members, whereby the bale forming chamber members may be moved angularly to and from each other at their discharge ends, a frame structure secured to the two spaced walls of the plunger chamber and extending alongside the bale chamber forming members and spaced outwardly therefrom, transverse tie members connecting the bale chamber forming members pivotally attached to and together at their ends adjacent the plunger chamber, links connecting the other ends of the bale chamber forming members to the frame structure, said links extending at an angle with respect to the transverse axis of the baler, whereby movement of the bale chamber forming members in the direction of the bale movement causes the forward ends of said members to diverge and increase the transverse tension of the transverse bale chamber, and resilient means for urging the bale chamber forming members towards the plunger chamber thereby tending to converge the discharge ends of said members.

11. A baler of the type having a plunger chamber having at least two opposite walls formed of a pair of channel members having relatively wide bases and relatively narrow flanges thereon, said members being spaced apart to form a rectangular chamber, at least a pair of spaced apart bale chamber forming members having the same cross-section as said channel members and being substantially in alignment therewith, retaining members secured to said bale chamber forming members and overlapping the ends of the plunger forming chamber members, whereby the bale forming chamber members may be moved angularly to and from each other at their discharge ends, a frame structure secured to the two spaced walls of the plunger chamber and extending alongside the bale chamber forming members and spaced outwardly therefrom, transverse tie members connecting the bale chamber forming members together at their ends adjacent the plunger chamber, links connecting the other ends of the bale chamber forming members to the frame structure, said links extending at an angle with respect to the transverse axis of the baler, whereby movement of the bale chamber forming members in the direction of the bale movement causes the forward ends of said members to diverge and increase the transverse tension of the transverse bale chamber, a stabilizing link connected to one bale chamber forming member near its rear end and to the other bale chamber forming member near its forward end, whereby movement of one member carries the other member in the same direction for substantially the same distance, and resilient means for urging the bale chamber forming members towards the plunger chamber thereby tending to converge the discharge ends of said members.

12. A baler construction of the type having a plunger chamber having at least two opposite walls formed of a pair of channel members having relatively wide bases and relatively narrow flanges thereon, said members being spaced apart to form a rectangular chamber, at least a pair of spaced apart bale chamber forming members having the same cross-section as said channel members and being substantially in alignment therewith, retaining members secured to said bale chamber forming members and overlapping the ends of the plunger forming chamber members, whereby the bale forming chamber members may be moved angularly to and from each other at their discharge ends, a frame structure secured to the two spaced walls of the plunger chamber and extending alongside the bale chamber forming members and spaced outwardly therefrom, said frame structure including a pair of spaced members at each side, transverse tie members connecting the bale chamber forming members together at their ends adjacent the plunger chamber, links connecting the other ends of the bale chamber forming members to the frame structure, said links extending at an angle with respect to the transverse axis of the baler, whereby movement of the bale chamber forming members in the direction of the bale movement causes the forward ends of said members to diverge and increase the transverse tension of the transverse bale chamber, a stabilizing link connected to one bale chamber forming member near its rear end and to the other bale chamber forming member near its forward end, whereby movement of one member carries the other member in the same direction for substantially the same distance, brackets connected to the outer sides of the bale chamber forming member near their forward ends and centrally between the respective spaced members of the frame structure, brackets connected between the frame structure forming members adjacent their rear ends, resilient means in the form of longitudinally extending tension springs connecting said bracket members for urging the bale chamber forming members towards the plunger chamber thereby tending to converge the discharge ends of said members, means to adjust the tension on said springs to thereby adjust the compression on the bales being formed, and transverse means to connect the forward ends of the frame structure spaced members.

13. In a baling press of the type having a plunger chamber and a bale chamber having at least two rearwardly movable walls extending in the direction of the bale movement, a frame structure extending alongside said walls and spaced outwardly therefrom, links connecting the rear and discharge ends of the bale chamber walls to the frame structure, said links extending at an angle with respect to the transverse axis of the baling press, whereby movement of the walls rearwardly in the direction of the bale movement causes the discharge ends of said walls to diverge and to increase the transverse dimension of the bale chamber, and resilient means connecting the walls and the frame structure for urging the walls forwardly thereby tending to converge the discharge ends of said walls, said resilient means including brackets on the forward ends of the bale chamber walls, brackets on the rear portions of the frame structure, and tension springs connecting said brackets.

CLIFFORD E. TOTMAN.

REFERENCES CITED

The following references are of record in the file of this patent:

UNITED STATES PATENTS

| Number | Name | Date |
|---|---|---|
| 2,389,510 | Hitchcock | Nov. 20, 1945 |